(12) United States Patent
Bosco et al.

(10) Patent No.: US 10,706,440 B2
(45) Date of Patent: *Jul. 7, 2020

(54) SYSTEMS AND METHODS FOR ADVERTISING ON CONTENT-SCREENED WEB PAGES

(71) Applicant: Oath (Americas) Inc., Dulles, VA (US)

(72) Inventors: Eric Bosco, Washington, DC (US); Matthew Nguyen, Fairfax Station, VA (US); Thu R. Kyaw, Reston, VA (US); Qiuming Yan, Ashburn, VA (US)

(73) Assignee: Verizon Media Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,178

(22) Filed: Apr. 7, 2014

(65) Prior Publication Data

US 2014/0222554 A1 Aug. 7, 2014

Related U.S. Application Data

(63) Continuation of application No. 12/612,270, filed on Nov. 4, 2009, now Pat. No. 8,712,847.

(60) Provisional application No. 61/111,624, filed on Nov. 5, 2008.

(51) Int. Cl.
*G06Q 30/02* (2012.01)
(52) U.S. Cl.
CPC ......... *G06Q 30/0246* (2013.01); *G06Q 30/02* (2013.01); *G06Q 30/0263* (2013.01)

(58) Field of Classification Search
CPC ..................................................... G06Q 30/02
See application file for complete search history.

(56) References Cited

U.S. PATENT DOCUMENTS

| 8,589,391 | B1* | 11/2013 | Reynar | G06F 17/30867 |
| | | | | 707/732 |
| 2005/0132042 | A1* | 6/2005 | Cryer | H04L 63/0227 |
| | | | | 709/224 |
| 2005/0144069 | A1 | 6/2005 | Wiseman et al. | |
| 2005/0154746 | A1* | 7/2005 | Liu et al. | 707/101 |
| 2006/0224445 | A1* | 10/2006 | Axe et al. | 705/14 |
| 2006/0253437 | A1 | 11/2006 | Fain et al. | |

(Continued)

OTHER PUBLICATIONS

Tang, et al; Focused Crawling for both Topical Relevance and Quality of Medical Information; CIKM '05 Preceedings, and 2005 ACM, available at: https://dl.acm.org/doi/pdf/10.1145/1099554.1099583?download=true. Last accessed Feb. 11, 2020. (Year: 2005).*

(Continued)

*Primary Examiner* — Katherine Kolosowski-Gager
(74) *Attorney, Agent, or Firm* — Bookoff McAndrews, PLLC

(57) ABSTRACT

According to one aspect of the present disclosure, a method is provided for advertising on a content-screened web page. The method includes receiving an impression request for a URL for which an advertising impression is desired; screening HTML content of a web page identified by the URL; generating a rating for the URL based on the HTML content of the web page; assigning the rating to the impression request; and serving an advertising impression on the web page based on the rating.

19 Claims, 3 Drawing Sheets

(56) References Cited

U.S. PATENT DOCUMENTS

2007/0282693 A1* 12/2007 Staib ................. G06Q 30/02
705/26.5
2008/0010270 A1   1/2008 Gross
2009/0048908 A1*  2/2009 Kaplan et al. ................. 705/10

OTHER PUBLICATIONS

PCT Search Report and Written Opinion dated Oct. 15, 2010, in corresponding PCT Application No. PCT/US09/63263 (10 pages).

* cited by examiner

SYSTEMS AND METHODS FOR ADVERTISING ON CONTENT-SCREENED WEB PAGES

RELATED APPLICATION(S)

This application is a continuation of prior U.S. patent application Ser. No. 12/612,270, filed on Nov. 4, 2009 (now allowed), which claims the benefit of priority of U.S. Provisional Application No. 61/111,624, filed on Nov. 5, 2008. The disclosures of the above-referenced applications are expressly incorporated herein by reference to their entireties.

TECHNICAL FIELD

The present disclosure relates generally to systems and methods for advertising on web pages. More particularly, and without limitation, the present disclosure relates to systems and methods for rating the content of a web page and delivering advertising to the web page based on the content rating.

BACKGROUND

Since the early 1990'S, the number of people using the World Wide Web has grown at a substantial rate. As more users take advantage of the World Wide Web, higher volumes of traffic are generated over the Internet. Because the benefits of commercializing the Internet to take advantage of these higher traffic volumes can be tremendous, businesses increasingly seek means to advertise their products or services on-line. These advertisements may appear, for example, in the form of leased advertising space (e.g., "banners") on websites or as advertisements presented to digital television users, which are comparable to rented billboard space or to commercials broadcasted during television or radio programs.

When a company advertises on a website, it may benefit from the volume of advertisements or impressions that it places on the website, the number of users that select or "click" on each advertisement, and the number of sales or other "conversions" that result from each display of an advertisement. Each instance that an advertisement is placed on a web page may be referred to as an "impression." Companies may pay per impression, per click, and/or per conversion. As a result, it may be advantageous for advertisers to increase the number of web pages on which companies may display advertisements.

Traditionally, advertising services acquired an inventory of empty ad space on particular known web sites, such as news sites and commerce sites, which could then be offered to companies based on the desirability of advertising on the particular web site. Recently, there has been a significant increase in the quantity of user-generated content ("UGC") sites, on which a large proportion of the site's content is created and posted by users, rather than administrators or professional contributors. For example, there has been a significant increase in social networking sites, blogs, review sites, file sharing sites, and personal opinion sites. Because these sites are growing in number and drawing more web traffic, it is becoming more desirable to advertise on these sites. However, many advertisers are hesitant to have ad networks display their ads on UGC sites that could have offensive or objectionable material posted thereon by users. For example, a children's media provider may desire to display ads on a high-traffic, house pet-related MySpace page, but not on a high-traffic, gambling-related MySpace page. In the past, advertising services have been unable to distinguish between particular pages of a web site (e.g., between two different pages on MySpace.com), when offering ad inventory to content-sensitive advertisers.

The present disclosure is directed to increasing the amount of advertising on web sites by solving one or more of the above-mentioned challenges.

SUMMARY

In accordance with one exemplary embodiment, the present disclosure is directed to a method for advertising on a content-screened web page. The method includes receiving an impression request for a URL for which an advertising impression is desired; screening HTML content of a web page identified by the URL; generating a rating for the URL based on the screened HTML content of the web page; assigning the rating to the impression request; and serving an advertising impression on the web page based on the rating.

In accordance with another exemplary embodiment, the present disclosure is directed to a method for delivering advertising to a publisher of a content site. The method includes receiving an impression request from a publisher of a content site on which an advertising impression is desired; generating a rating for the content site based on HTML content of the content site; appending the rating to the impression request; and sending the impression request and rating to an ad server.

In accordance with another exemplary embodiment, the present disclosure is directed to a method for delivering advertising to a publisher of a content site. The method includes receiving an impression request from a publisher of a content site on which an advertising impression is desired; appending an existing rating to the impression request if a rating for the content site is stored in a response cache; adding a URL for the content site to a request queue if a rating for the content site is not stored in the response cache; generating a new rating for the content site based on HTML of the content site if a rating for the content site is not stored in the response cache; and appending the new rating to the impression request once it is generated.

Additional features and advantages will be set forth in part in the description which follows, and in part will be obvious from the description, or may be learned by practice of the embodiments of the invention. For example, the features and advantages may be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

Figure 1:
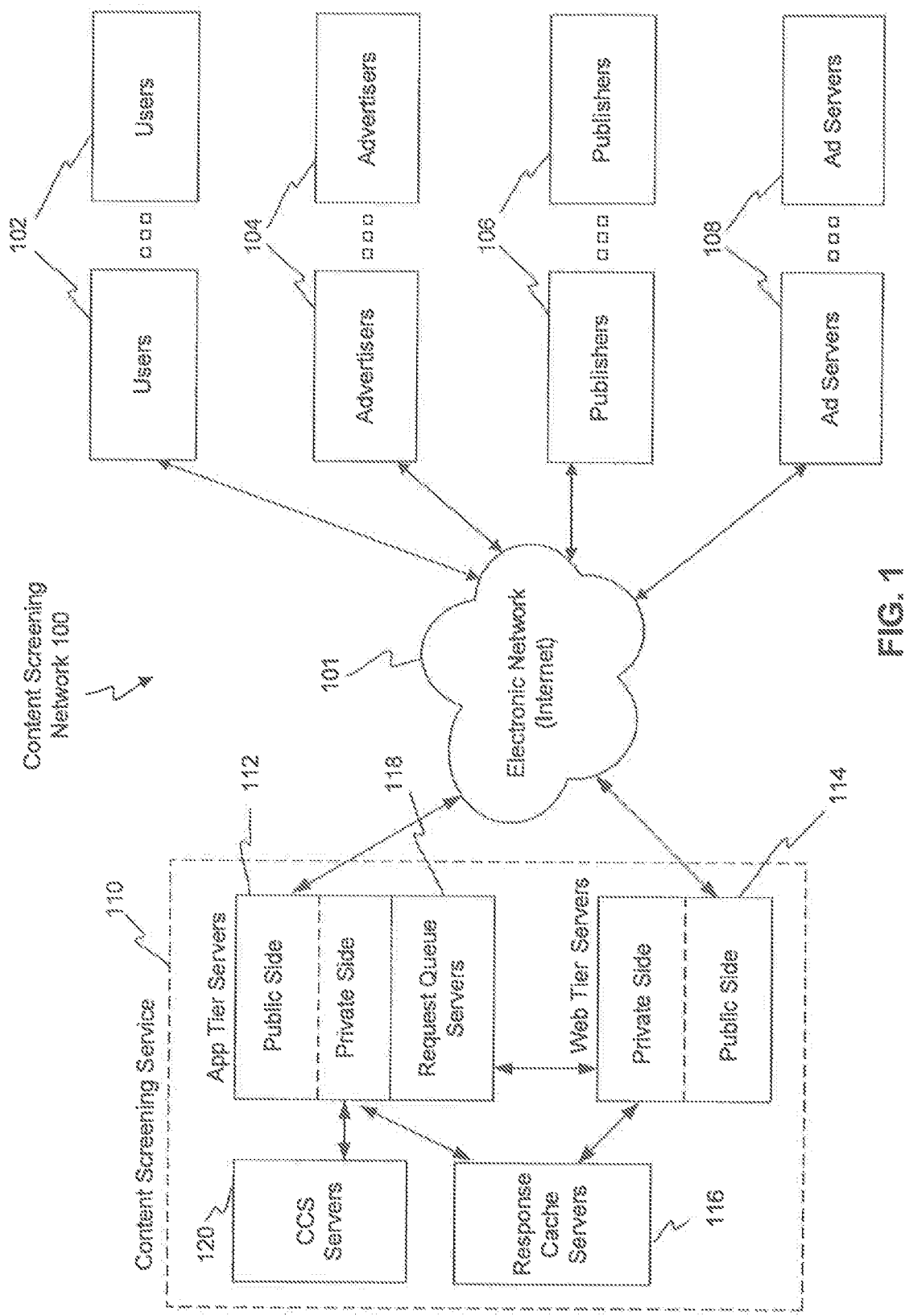
FIG. 1 shows a block diagram of an exemplary network for placing advertising on content-screened web pages.

FIG. 1 illustrates an exemplary content screening network 100 for placing advertising on content-screened web pages. Network 100 may include a plurality of users 102, advertisers 104, publishers 106, ad servers 108, and a content screening service 110, all disposed in communication with the Internet 101. As will be described in more detail below, in certain embodiments, network 100 may be configured to receive advertisements from advertisers 104, rate web pages hosted by publishers 106 using content screening service 110, and instruct ad servers 108 to deliver the advertisements on web pages of various publishers 106, based on the ratings generated by content screening service 110.

Advertisers 102 may include any entities having online advertisements (e.g., banner ads, pop-ups, etc.) desired to be delivered to online users. For example, advertisers 102 may have created advertisements relating to products or services marketable to one or more online users. Advertisers 102 may interact with publishers 106, ad servers 108, and/or content screening service 110 through computers connected to the Internet 101. Thus, advertisers 104 may be able to communicate advertising campaign information, such as ad information, targeting information, consumer information, budget information, bidding information, etc., to other entities in network 100.

Publishers 106 may include any entities having inventories of available online advertising space. For example, publishers 106 may include online content providers, search engines, e-mail programs, or any other online site or program having online user traffic. In one embodiment, publishers 106 may host user generated content (UGC) sites, such as social networking sites, blogs, review sites, file sharing sites, and personal opinion sites. Publishers 106 may interact with advertisers 104, ad servers 108, and/or content screening service 110 via computers connected to the internet 101. Thus, publishers 106 may be able to communicate inventory information, such as site information, demographic Information, cost information, etc., to other entitles in network 100.

Ad servers 108 may include any type of servers configured to process advertising information from advertisers 104 and/or site information from publishers 106, either directly or indirectly. In certain embodiments, ad servers 108 may be remote web servers that receive advertising information from advertisers 104 and serve ads to be placed by publishers 106. Ad servers 108 may be configured to serve ads across various domains of publishers 106, for example, based on advertising information provided by advertisers 104. Ad servers 108 may also be configured to serve ads based en contextual targeting of web sites, search results, user profile information, and/or web page ratings generated by content screening service 110. Ad servers 108 may also be configured to generate behavioral logs, leadback logs, click logs, action logs, and impression logs, based on users' interactions with web sites and ads implemented by network 100.

Network 100 may also include a plurality of users 102 provided in communication with the Internet 101 and able to visit web pages hosted by publishers 106. The term "user," "customer," or "person," as used herein, may refer to any consumer, viewer, or visitor of a Web page or site and can also refer to the aggregation of individual customers into certain groupings. References to customers "viewing" ads is meant to include any presentation, whether visual, aural, or a combination thereof.

In one embodiment, content screening service 110 may include a plurality of app tier servers 112, a plurality of web tier servers 114, a plurality of response cache servers 116, a plurality of request queue servers 118, and a plurality of content categorization service (CCS) servers 120. Each of the app tier servers 112 and web tier servers 114 may include a public side that interfaces with the internet 101, separated by a firewall from a private side that interfaces with other components of content screening service 110. In one embodiment, request queue servers 118 may be disposed in communication with the private sides of app tier servers 112 and web tier servers 114. Likewise, response cache servers 116 may be disposed in communication with the private sides of app tier servers 112 and web tier servers 114. CCS servers 120 may be disposed in communication with the private side of app tier servers 112. These components of content screening service 110 may be configured to receive advertising impression requests from publishers 106, rate or otherwise analyze a web page associated with the impression request, and instruct ad servers 108 to serve ads on the web page based on any ratings generated by content screening service 110.

Figure 2:
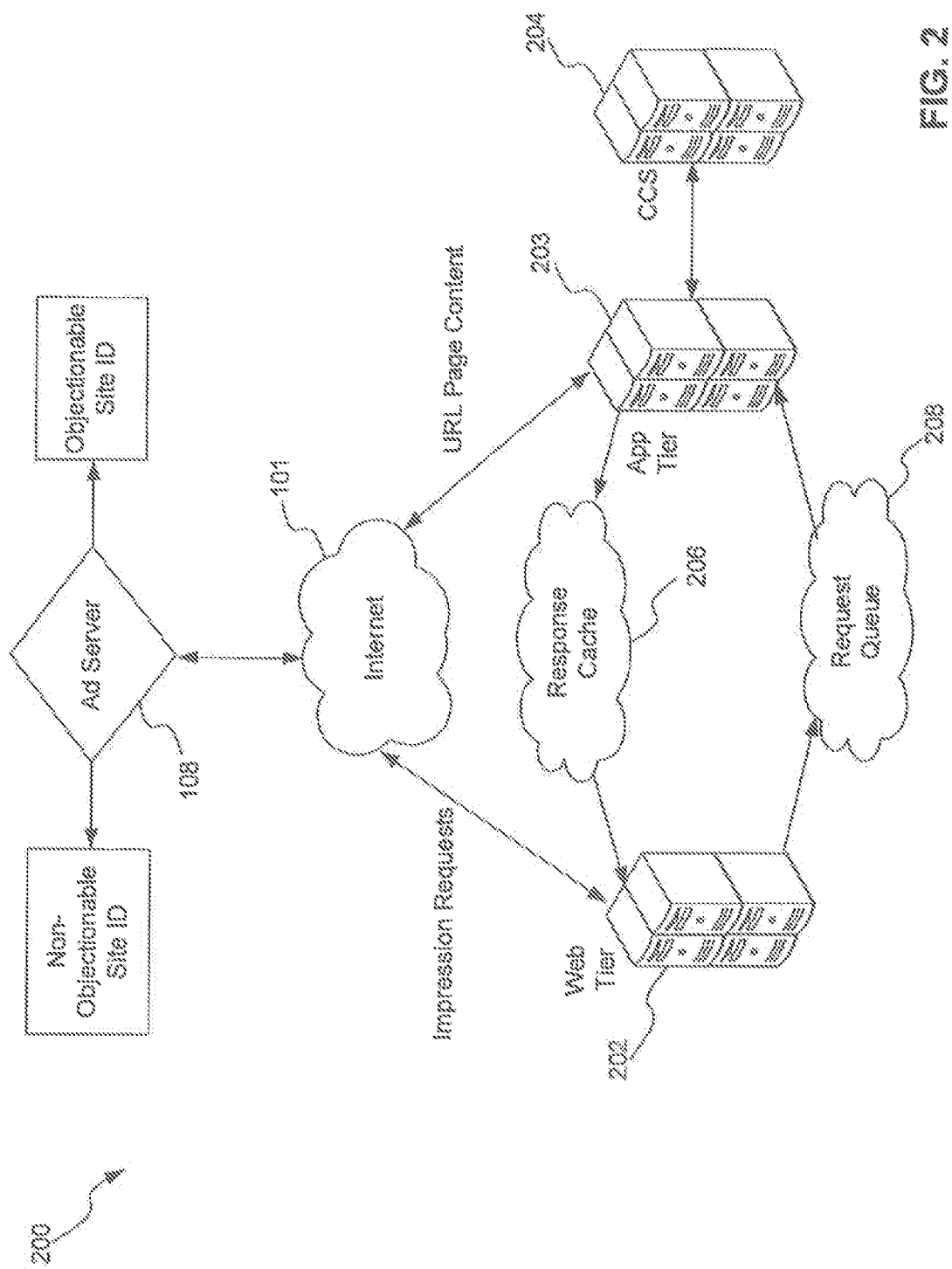
FIG. 2 shows a block diagram of an exemplary architecture for placing advertising on content-screened web pages.

FIG. 2 shows a block diagram of an exemplary architecture 200 for placing advertising on content-screened web pages using content screening service 110 of FIG. 1. In general, architecture 200 may operate on one or more servers described with respect to content screening service 110, in any desired combination or configuration. For instance, in one embodiment, web tier 202 may run on web tier servers 114, application tier 203 may run on app tier servers 112, CCS engine 204 may run on CCS servers 120, response cache 206 may reside on response cache servers 116, and request queue 208 may reside on request queue servers 118. Of course, any other suitable combinations or configurations of software and/or hardware may be implemented, as will now be appreciated by one of skill in the art.

In one embodiment, architecture 200 may include web tier 202 provided in communication with application tier 203 and content categorization service ("CCS") engine 204. Web tier 202 may be configured to receive impression requests from publishers 106 through the Internet 101. Specifically, when one of users 102 visits a web page hosted by one of publishers 106, that publisher 106 may send an impression request to one of ad servers 108, requesting a suitable banner ad to serve on the visiting user 102. Web tier 202 may be configured to intercept each impression request, check an associated web page URL against other URLs stored in response cache 206, and send the associated web page URL to request queue 208 to be processed by app tier 203 and rated by CCS engine 204, as will be described in more detail below.

CCS engine 204 may be configured to generate ratings for a URL of a web page based on the content of the web page. Web tier 202 and application tier 203 may be in communication with response cache 206, which is configured to store URL ratings generated by CCS engine 204. Response cache 206 may be a distributed cache disposed across numerous data storage devices and configured to store millions of web page ratings. Web tier 202 and application tier 203 may also be in communication with request queue 208, which is configured to store URL screening requests generated by web tier 202. Request queue 208 may be a reference counting queue configured to determine how many times each URL has been referred by web tier 202. Thus, web tier 202 may be configured to receive impression requests from a web site, and then send the URL of the web site to either the request queue 208 or an ad server 108, depending on whether the URL has already been screened, ranked, and stored in response cache 206 by application tier 203 and CCS engine 204. Ad server 108 may be configured to generate either an objectionable site ID or a non-objectionable site ID, based on the content of the web page, as determined by CCS engine 204. Skilled artisans will now appreciate that certain components of FIG. 2 may be combined, rearranged, or omitted without departing from the spirit and scope of the invention.

Figure 3:
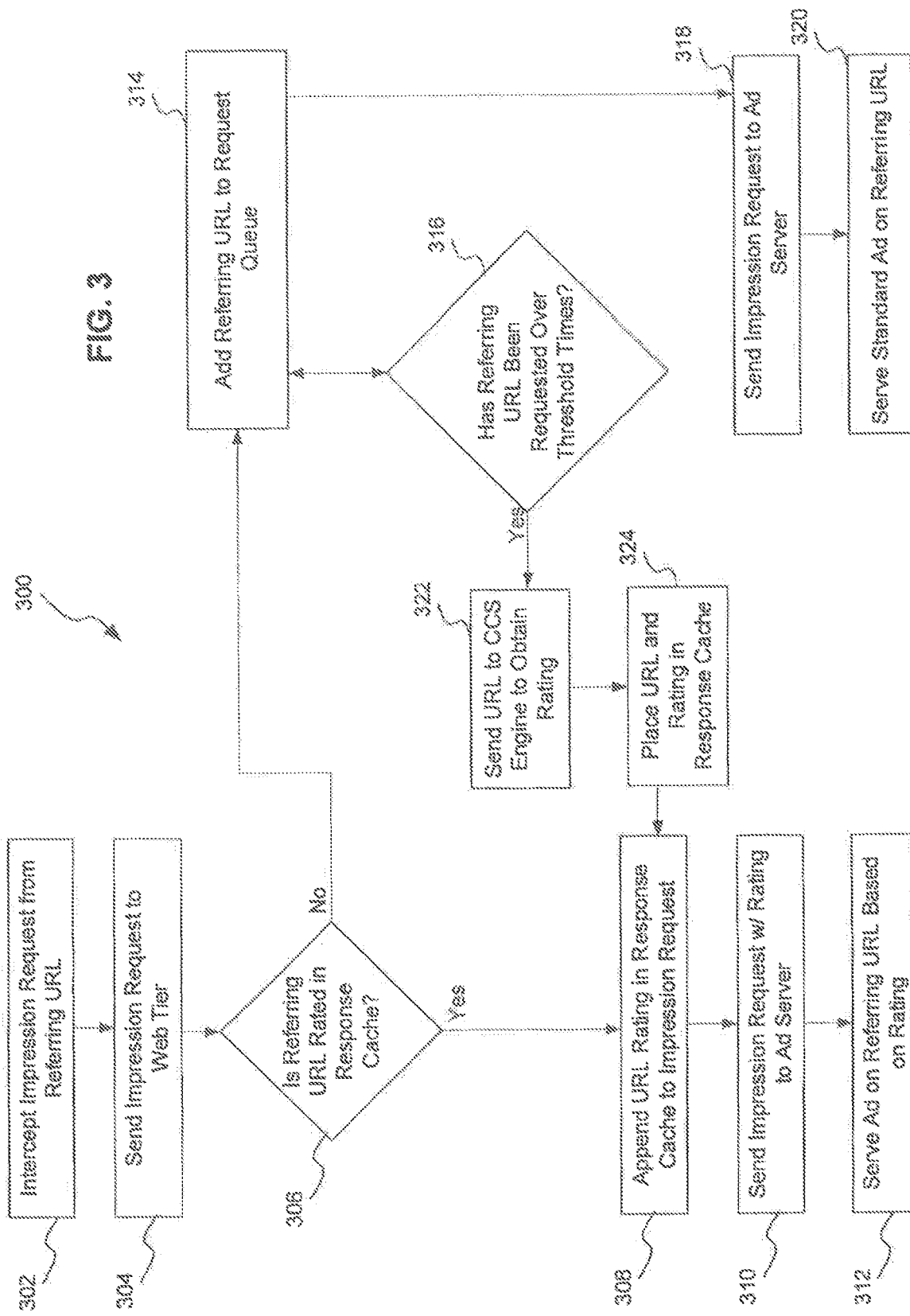
FIG. 3 illustrates an exemplary method for placing advertising on content-screened web pages, using the exemplary network of FIG. 1 and architecture of FIG. 2.

The operation of network 100 and architecture 200 will be described in greater detail with respect to FIG. 3, which depicts an exemplary method 300 for placing advertising on content-screened web pages. Method 300 includes receiving an impression request from a referring URL (302) and sending the impression request to web tier 202 (304). Web tier 202 determines whether the referring URL is rated and stored in response cache 206 (step 306). For example, web tier 202 may extract a document referring address ("DREF") parameter embedded in the impression request and use if as a key to look up the URL in response cache 206. If the referring URL is rated and stored in response cache 206, then web tier 202 appends the URL rating to the impression request (308). Web tier 202 then sends the impression request and rating to ad server 108 (310). Ad server 108 then serves an ad on the referring URL based on the rating (312), as will be described in greater detail below.

If the referring URL is not rated and stored in response cache 206 (step 308, No), then web tier 202 adds the referring URL (e.g., the DREF parameter) to request queue 208 (314). Web tier 202 then sends the impression request to ad server 108 for delivery using standard ad delivery parameters (318). Ad server 103 then serves a standard ad on the referring URL (320) by, for example, serving an ad from a company that is not sensitive to the content of the web page.

Because request queue 208 may be a reference counting queue, request queue 208 may determine how many times each URL is referred by web tier 202. Request queue 208 may also store a threshold value which defines how many times a URL is referred by web tier 202 before it is rated by CCS engine 204. For example, because screening and rating may be a time and resource intensive process, it may be desirable to only screen and rate web pages that receive a certain level of web traffic. Thus, request queue 208 can be configured to determine, asynchronously, and/or upon each request, whether a threshold number of requests for that URL (e.g., 100 times, or 1000 times) has been exceeded (316). In one embodiment, application tier 203 repeatedly queries request queue 208 to determine whether a threshold number of requests has been exceeded. Application tier 203 may query request queue 208 at configurable predetermined intervals.

If the referring URL has been requested more than the threshold number of requests, then application tier 203 retrieves web content of the referring URL from the Internet, and sends it to CCS engine 204 to be screened and rated (322). CCS engine 204 screens and rates the content of the referring URL, and then application tier 203 places the URL and its rating in response cache 206, where it may now be accessed by web tier 202 any time it is subsequently requested (324). In an embodiment in which CCS engine 204 screens and rates the content of the referring URL within an acceptable amount of time, the URL rating may be appended to the very same impression request that caused the URL to exceed the request queue threshold and to initiate CCS screening and rating (308). Then, web tier 202 sends the impression request and rating to ad server 108 (310). Ad server 108 then serves an ad on the referring URL based on the rating (312).

In order to screen and rate web pages, CCS engine 204 either fetches the raw HTML of the referring URL from the Internet, or receives it from application tier 203, which retrieves it from the internet 101. CCS engine 204 then parses each word, image file, audio file, and/or video file associated with the URL for the purposes of categorizing the URL. In one embodiment, CCS engine 204 rates each URL in relation to four objectionable categories: pornographic sites, hate sites, weapons-related sites, and drug-related sites. For example, CCS engine 204 may give each URL a "yes" or "no" rating for each of the four objectionable categories. Alternatively, CCS engine 204 may assign each URL a numerical value between 0 and 1 for each of the four objectionable categories. Of course, it is contemplated that any type and number of categories may be implemented within the scope of the systems and methods of this disclosure. For example, CCS engine 204 may be configured to determine and rate the particular interest and sentiment of each URL for the purpose of achieving more targeted ad delivery, such as serving sports-related ads on the personal profiles of users exhibiting a strong interest in sports.

In one embodiment, CCS engine 204 extracts words out of a formatted web page in order to generate a list of features associated with the web page. CCS engine 204 then removes "stop words" (e.g., "about", "all", "and", "are", "as", "at", "back", "because", etc.) from the list of features to reduce the number of features that do not contribute to identifying content and rating the URL within various categories. CCS engine 204 then determines the occurrence frequency of each feature in the URL and generates one or more category ratings based on known web pages and ratings that it has been trained to replicate. In one embodiment, CCS engine 204 implements content identification and categorization methods similar to those used for e-mail SPAM filters and/or parental control systems. CCS engine 204 may also be configured to overcome intentional misspellings, which may be more common among user-generated content sites than traditional sites. For example, CCS engine 204 may be trained to recognize words as "hate" words even if certain letters are omitted or replaced with other letters, numbers, or symbols. Moreover, CCS engine 204 may be configured to detect and categorize expressive language (e.g., "boringgggggg") to determine the overall sentiment of a URL, for example, as either "positive" or "negative" in tone. CCS engine 204 may also use feature expansion methods which expand each feature into other related known words by Implementing various methods, such as: (1) mapping (e.g., converting the feature "S3X" to "SEX"); (2) stemming (e.g., associating "ammunition", "ammunitions", and "munitions" with the feature "ammo"); and (3) thesaurus matching (e.g., matching "hate" to the feature "loath"). CCS engine 204 may implement any other language detection, pattern recognition, image categorization, or file parsing methods which may be useful for categorizing and rating a URL for purposes of controlling ad delivery.

In this manner, the systems and methods disclosed herein may be configured to deliver advertising to publishers of user generated content sites based on the content of those sites. As a result, advertisers may have their advertisements delivered to a more diverse array of inventory on the internet, and ad networks may increase the amount of revenue earned by selling online ad inventory. Moreover, the screening and categorization techniques disclosed herein may improve the targeted delivery of advertising to content pages based on comparative analysis of characteristics of the advertiser, the advertisement, the web page, and/or the publisher.

It will be apparent to those skilled in the art that various modifications and variations can be made in the system and method for reception in communication networks. It is intended that the standard and examples be considered as exemplary only, with a true scope of the disclosed embodiments being indicated by the following claims and their equivalents.

What is claimed is:

1. A method for content-screening of web pages to control the serving of online advertisements, the method comprising the following operations performed by one or more processors:
   receiving, from a client device, an impression request for a URL that is related to a web page, wherein the impression request includes a document referring address ("DREF") parameter;
   appending existing ratings to the impression request for the URL that is related to the web page if the existing ratings are stored in a response cache, wherein the existing ratings are included in the document referring address ("DREF") parameter;
   adding an identifier of the web page to a reference counting request queue if existing ratings for the web page are not stored in the response cache, wherein the reference counting request queue tracks how many times the identifier of the web page has been added to the request queue and indicates a number of impression requests for the web page;
   determining, by a request queue server, whether a number of impression requests received for the web page is greater than or Icy than a predetermined threshold;
   based on determining that the number of impression requests received for the web page is greater than the predetermined threshold, screening, by a content categorization service ("CCS") engine, HTML content of the web page for different categories of content, wherein the CCS engine fetches the HTML content from the web page;
   generating ratings for the web page based on the screened HTML content, the ratings comprising at least one rating for each of the different categories of content;
   serving a content-sensitive advertising impression for the web page based on the ratings; and
   serving a non-content-sensitive advertising impression for the web page if no ratings associated with the web page are stored in the response cache.

2. The method of claim 1, wherein the web page is a user generated content site that is one of a social networking site, blog, review site, file sharing site, or personal opinion site.

3. The method of claim 1, wherein serving the content-sensitive advertising impression for the web page is further based on one or more of: advertising information provided by an advertiser, contextual targeting information, search results information, and user profile information.

4. The method of claim 1, wherein screening HTML content of the web page includes generating a list of features associated with the web page and categorizing the web page into one of several objectionable categories.

5. The method of claim 4, further comprising removing stop words from the list of features associated with the web page.

6. The method of claim 1, wherein generating ratings includes generating a numerical value between 0 and 1 as a rating for each of the different categories of content.

7. A method for delivering advertising to publishers of content sites, the method comprising the following operations performed by one or more processors:
   receiving, from a client device, an impression request for a URL that is related to a content site, wherein the impression request includes a document referring address ("DREF") parameter;
   appending existing ratings to the impression request for the URL that is related to the content site if the existing ratings are stored in a response cache, wherein the existing ratings are included in the document referring address ("DREF") parameter;
   adding an identifier of the content site to a reference counting request queue if existing ratings for the content site are not stored in the response cache, wherein the reference counting request queue tracks how many times the identifier of the content site has been added to the request queue and indicates a number of impression requests for the content site;
   determining, by a request queue server, whether a number of impression requests received for the content site is greater than a predetermined threshold;
   based on determining that the number of impression request received for the content site is greater than the predetermined threshold, screening, by a content categorization service ("CCS") engine, HTML content of the content site for different categories of content, wherein the CCS engine fetches the HTML content from the web page;
   generating ratings for the content site based on the screened HTML content, the ratings comprising at least one rating for each of the different categories of content;
   storing the ratings for the content site with the identifier in the response cache server;
   serving the impression request with the generated ratings to the ad server; and
   serving a non-content-sensitive advertising impression for the content site if the content site is not associated with at least one rating.

8. The method of claim 7, wherein the content site is a user generated content site that is one of a social networking site, blog, review site, file sharing site, or personal opinion site.

9. The method of claim 7, further comprising serving a content-sensitive advertising impression for the content site based on any associated ratings and one or more of: advertising information provided by an advertiser, contextual targeting information, search results information, and user profile information.

10. The method of claim 7, wherein screening HTML content of the content site includes generating a list of features associated with the content site, and categorizing the content site into one of several objectionable categories.

11. The method of claim 10, wherein the screening further comprises removing stop words from the list of features associated with the content site.

12. The method of claim 7, wherein generating ratings includes generating a numerical value between 0 and 1 as a rating for each of the different categories of content.

13. A method for content-screening to control delivering advertising to publishers of web pages, the method comprising the following operations performed by one or more processors:
- appending existing ratings to a received impression request for a web page if any ratings for the web page are stored in a response cache, wherein the existing ratings are included in a document referring address ("DREF") parameter of the received impression request, and serving the impression request for the web page with the appended existing ratings to an ad server;
- adding an identifier for the web page of the received impression request to a reference counting request queue if existing ratings for the web page are not stored in the response cache, the request queue tracking how many times the identifier for the web page has been added to the request queue, which indicates a number of impression requests for the web page;
- determining, by a request queue server, if a number of impression requests received for the web page is greater than or less than a predetermined threshold;
- screening, by a content categorization service ("CCS") engine, HTML content of the web page for different categories of content if the number of impression requests is greater than the predetermined threshold, wherein the CCS engine fetches the HTML content from the web page;
- generating ratings for the web page based on the screened HTML content, the ratings comprising at least one rating for each of the different categories of content;
- storing the ratings for the web page with the identifier for the web page in the response cache;
- serving the impression request for the web page to the ad server with the generated ratings; and
- serving the impression request for the web page to an ad server without a rating when no rating for the web page is stored in the response cache.

14. The method of claim 13, wherein the response cache is a distributed cache configured to store millions of web page ratings.

15. The method of claim 13, wherein the web page is a user generated web page, such as a social networking site, blog, review site, file sharing site, or personal opinion site.

16. The method of claim 13, further comprising: serving a content-sensitive advertising impression for the web page based on any associated ratings for the web page, and serving a non-content-sensitive advertising impression for the web page when the web page is not associated with at least one rating.

17. The method of claim 13, wherein generating the ratings for the web page includes generating a list of features associated with the web page and categorizing the web page into one of several objectionable categories.

18. The method of claim 17, wherein generating the ratings further comprises removing stop words from the list of features associated with the web page.

19. The method of claim 13, wherein generating ratings includes generating a numerical value between 0 and 1 as a rating for each of the different categories of content.

* * * * *

UNITED STATES PATENT AND TRADEMARK OFFICE
CERTIFICATE OF CORRECTION

PATENT NO. : 10,706,440 B2
APPLICATION NO. : 14/247178
DATED : July 7, 2020
INVENTOR(S) : Eric Bosco et al.

Page 1 of 1

It is certified that error appears in the above-identified patent and that said Letters Patent is hereby corrected as shown below:

In the Claims

Column 7, Claim 1, Line 42, delete "or Icy than"

Signed and Sealed this
Eighth Day of December, 2020

Andrei Iancu
*Director of the United States Patent and Trademark Office*